(12) United States Patent
Gatts et al.

(10) Patent No.: US 11,546,648 B2
(45) Date of Patent: Jan. 3, 2023

(54) CONTENT DELIVERY SYSTEM FOR TELEVISION BROADCAST SYSTEMS

(71) Applicant: BLOOMBERG FINANCE L.P., New York, NY (US)

(72) Inventors: Derek Gatts, Bloomfield, NJ (US); Daniel Leach, Astoria, NY (US); Christine Woo, New York, NY (US); Evan Yeatts, Morrisville, PA (US)

(73) Assignee: BLOOMBERG FINANCE L.P., New York, NY (US)

( * ) Notice: Subject to any disclaimer, the term of this patent is extended or adjusted under 35 U.S.C. 154(b) by 359 days.

(21) Appl. No.: 16/217,544

(22) Filed: Dec. 12, 2018

(65) Prior Publication Data

US 2020/0195998 A1 Jun. 18, 2020

(51) Int. Cl.
*H04N 21/2665* (2011.01)
*H04N 21/262* (2011.01)
*H04N 21/81* (2011.01)

(52) U.S. Cl.
CPC ... *H04N 21/2665* (2013.01); *H04N 21/26258* (2013.01); *H04N 21/812* (2013.01)

(58) Field of Classification Search
CPC ............ H04N 21/2665; H04N 21/812; H04N 21/26258
See application file for complete search history.

(56) References Cited

U.S. PATENT DOCUMENTS

| | | | |
|---|---|---|---|
| 6,658,432 B1 * | 12/2003 | Alavi | G06F 16/972 |
| 6,738,804 B1 * | 5/2004 | Lo | G06F 16/9577 |
| | | | 709/219 |
| 8,302,122 B1 | 10/2012 | Hecht et al. | |
| 2008/0151888 A1 * | 6/2008 | Ahmed | H04N 21/475 |
| | | | 370/390 |
| 2008/0155618 A1 * | 6/2008 | Grady | H04N 21/4583 |
| | | | 725/97 |
| 2009/0133073 A1 * | 5/2009 | DaLaCruz | H04N 5/44543 |
| | | | 725/49 |
| 2010/0241498 A1 | 9/2010 | Chung et al. | |
| 2012/0059696 A1 | 3/2012 | Theberge et al. | |
| 2012/0060184 A1 | 3/2012 | Nguyen et al. | |
| 2016/0191474 A1 * | 6/2016 | Hinh | G06Q 30/04 |
| | | | 713/154 |
| 2016/0316066 A1 * | 10/2016 | Charugundla | H04M 7/0039 |

FOREIGN PATENT DOCUMENTS

WO 01/24421 A2 4/2001

OTHER PUBLICATIONS

International Search Report and Written Opinion dated Feb. 19, 2020, in connection with International Patent Application Serial No. PCT/US2019/065120, filed Dec. 9, 2019, 13 pgs.

* cited by examiner

*Primary Examiner* — Yassin Alata
(74) *Attorney, Agent, or Firm* — Chiesa Shahinian & Giantomasi PC (57) ABSTRACT

Systems and methods are provided for facilitating the selection of content for a television broadcast system. A first request for content in a broadcasting based format is received from a television broadcast system. A second request for content in a computer based format is sent to a network-based content selection system. A content identifier associated with selected content is received from the network-based content selection system and sent to the television broadcast system.

20 Claims, 5 Drawing Sheets

| Time | Description | Length |
|---|---|---|
| 9:00:00 | Business Program | 1:00:00 |
| 9:00:00 | Live segment from NY | 0:10:00 |
| 9:09:57 | Cue Tone marker for upcoming commercial break | 0:00:00 |
| 9:10:00 | Break | 0:02:00 |
| 9:10:00 | Commercial A | 0:00:30 |
| 9:10:30 | Commercial B | 0:00:30 |
| 9:11:00 | Promotion | 0:00:30 |
| 9:11:30 | Weather | 0:00:30 |
| 9:11:57 | Cue Tone marker for upcoming program segment | 0:00:00 |
| 9:12:00 | Live segment from London | 0:08:00 |

CONTENT DELIVERY SYSTEM FOR TELEVISION BROADCAST SYSTEMS

TECHNICAL FIELD

The present invention relates generally to a content delivery system for a television broadcast system, and more particularly to a content delivery system for facilitating communication between a network-based content selection system and the television broadcast system to select and/or schedule content for broadcast on the television broadcast system.

BACKGROUND OF THE INVENTION

Traditional television broadcasting is typically linearly programmed by creating a transmission log to schedule shows, advertisements, and other content selected by a broadcaster for broadcasting at predetermined times. Such transmission logs must be sent to the broadcaster hours or sometimes days before the scheduled transmission, limiting a broadcaster's ability to accept late bookings and from making any changes to the transmission log. However, in some situations, the transmission log must be modified to address breaking news, negative news coverage, emergencies, natural disasters, etc. In such situations, an updated transmission log would need to be created, which may take many hours and great care so as to avoid errors resulting in interruptions in the transmission.

One particularly challenging area in linearly programmed television broadcasting is the scheduling of television broadcasting advertisements in the transmission log. One factor in scheduling television broadcasting advertisements is capacity. Unlike digital internet-based advertisements where capacity changes with the number of site visitors or print-based advertisements where additional magazine pages can be added, the capacity of television broadcasting advertisements is finite and determined by the duration and structure of the television shows. Another factor in scheduling television broadcasting advertisements is the booking requirements of the advertisers. For example, an advertiser may book an advertisement for a specific daypart, television show, or day. Further, advertisers may place limits on the number of competing advertisements for a given break and require time separation between their advertisements and from competing advertisements. A further factor in scheduling television broadcasting advertisements is pre-empted or missed advertisements. An advertisement can be pre-empted due to any number of reasons, such as technical difficulties or programming changes. Due to the linear nature of television broadcasting, pre-empted advertisements may not broadcast for weeks or even months from their initially scheduled broadcast time. The competing factors associated with scheduling television broadcasting advertisements makes such scheduling challenging, and may result in advertisements not being scheduled to air when capacity is available.

Some television advertisement sales systems use selling titles to simplify the advertisement booking and scheduling process. Selling titles are product lines, consisting of a program or time period scheduled within a broadcast day, that can be sold to an advertiser. Selling titles require certain information, such as, e.g., daypart, television show, and days, for advertisers to define in order to book an advertisement. This greatly simplifies the scheduling of television broadcasting advertisements, but can limit flexibility in scheduling and the ability to make good on pre-empted advertisements.

In digital internet-based advertising an advertising content server analyzes the potential yield and delivery needs of each available advertisement and automatically selects an advertisement for displaying on a web page. This process takes milliseconds and allows for the analysis of a large number of potential advertisements before delivery. Additionally, a user may adjust priorities of advertisements, change the inventory of advertisements, apply frequency caps to control how often a user views an advertisement, and can adjust the total number of times that an advertisement should play over a period of time. Such user adjustments can be performed within minutes.

While conventional network-based content servers provide for automatically selecting advertisements and other content, such conventional network-based content servers are unable to interact with television broadcasting systems to automate scheduling and selection of content for broadcasting by the television broadcasting system. In particular, there is currently no mechanism for television broadcasting systems to communicate with digital, network-based content servers. Further, such content servers are unable to host and deliver the content for broadcasting by a television broadcasting system.

SUMMARY

In accordance with one or more embodiments, systems and methods are provided for facilitating the selection of content for broadcasting by a television broadcast system. Advantageously, the embodiments described herein provide for a bridging system for receiving a request for content from a television broadcast system in a broadcasting based format and communicating with a network-based content selection system (e.g., a digital advertisement server) in a computer based format, thereby allowing the content selection system to select and/or schedule content for broadcasting by the television broadcast system and reducing or eliminating some of the manual scheduling of content (e.g., advertisements) on the transmission log.

In accordance with one or more embodiments, a first request for content in a broadcasting based format (e.g., cue tones) is received from a television broadcast system. A second request for content in a computer based format (e.g., JavaScript) is sent to a network-based content selection system. In response to the network-based content selection system selecting content, a content identifier associated with the selected content is received from the network-based content selection system. The content identifier is sent to the television broadcast system for broadcasting the selected content in a television broadcast.

In accordance with one or more embodiments, the first request for content is received from the television broadcast system is in response to a first marker in a transmission log. The first marker may be an ad window open marker indicating that a time window for broadcasting content is opened. The first marker may be in the broadcasting based format (e.g., cue tones).

In accordance with one or more embodiments, the second request for content is intermittently sent to the network-based content selection system at a predefined time interval. For example, the second request for content may be intermittently sent until a confirmation is received indicating that the selected content has been broadcasted. In another example, the second request for content may be intermittently sent until an indication to stop requesting content is received. The indication to stop requesting content may be received in response to a second marker in a transmission log, where the second marker indicates that a time window for broadcasting content is closed. The second marker may be in the broadcasting based format (e.g., cue tones).

In accordance with one or more embodiments, a system for broadcasting content is provided. The system includes a television broadcast system, a network-based content selection system, and a bridging system. The television broadcast system sends a first request for content in a broadcasting based format to the bridging system. The bridging system sends a second request for content in a computer based format to the network-based content selection system in response to the first request for content in the broadcasting based format. The network-based content selection system selects content in response to the second request for content and sends a content identifier associated with the selected content to the bridging system. The bridging system sends the content identifier to the television broadcast system.

These and other advantages of the invention will be apparent to those of ordinary skill in the art by reference to the following detailed description and the accompanying drawings.

DETAILED DESCRIPTION

Figure 1:
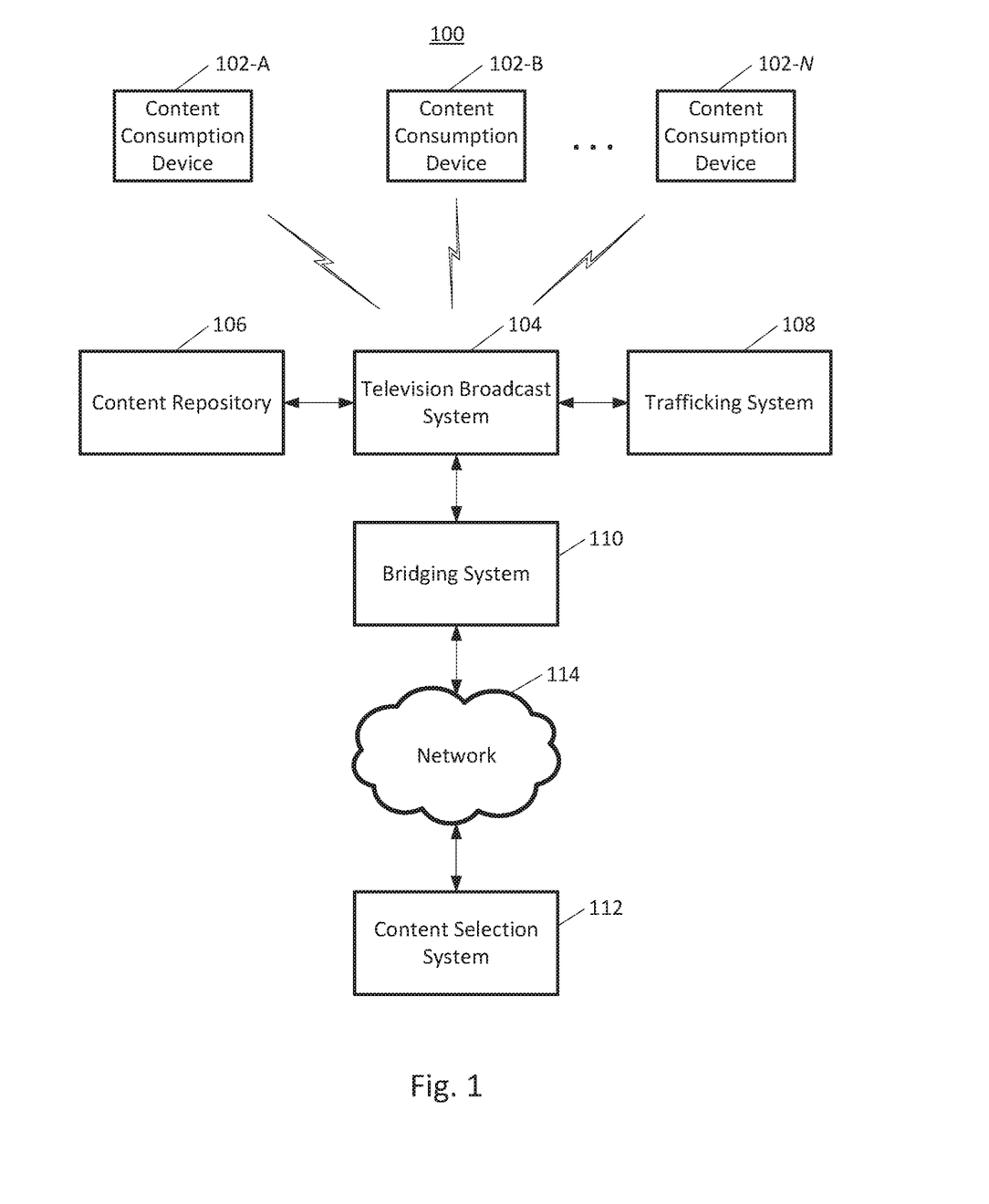
FIG. 1 shows a high-level diagram of a communications system, in accordance with one embodiment.

FIG. 1 shows a high-level diagram of a communications system 100 for facilitating the delivery of content for television broadcasting, in accordance with one or more embodiments. Communications system 100 includes a television broadcast system 104. Television broadcast system 104 may be any suitable system for broadcasting television, such as, for example, an over-the-air (OTA) terrestrial television broadcast system, a cable television system, or a satellite television system. Television broadcast system 104 broadcasts or transmits content retrieved from a content repository 106 to content consumption devices 102-A, 102-B, . . . 102-N (collectively referred to herein as content consumption devices 102) for viewing or otherwise consuming by end users.

Figure 2:
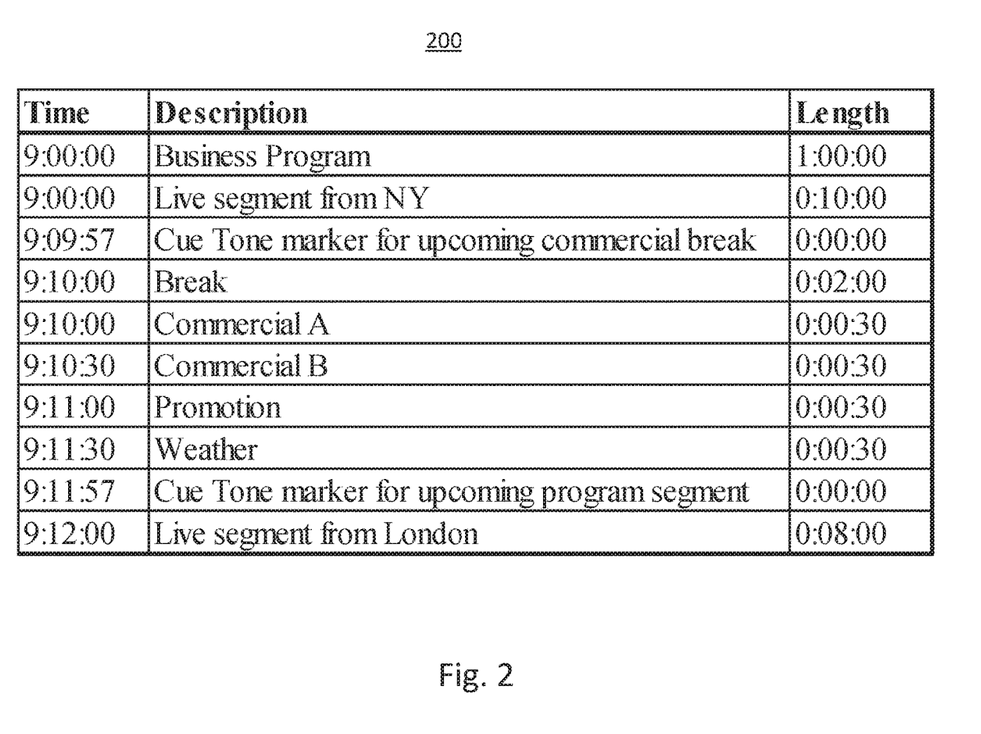
FIG. 2 shows an exemplary transmission log, in accordance with one embodiment.

Television broadcast system 104 broadcasts content to content consumption devices 102 according to a transmission log generated and maintained by trafficking system 108. Trafficking system 108 manages content broadcasted by television broadcast system 104. For example, trafficking system 108 may book, process, schedule, and report on all television programming, advertising, and any other content. The transmission log, also known as a broadcast log, playlist, or schedule, is a sequence of events that dictates the structure and content (e.g., television shows, advertisements, supplemental content, etc.) to be broadcasted by television broadcast system 104 for a given period of time (e.g., a 24 hour period). An exemplary transmission log 200 is shown in FIG. 2.

Television broadcast system 104 transmits the content retrieved from content repository 106 to content consumption devices 102 via any suitable medium, such as, for example, via OTA, coax or fiber optic cable, or satellite. Content consumption devices 102 may include any device, or combination of devices, suitable for receiving the content from television broadcast system 104 and presenting the content for consumption by end users. For example, content consumption device 102 may include one or more of a display device (e.g., television), a cable box, a satellite receiver, an optical network terminal, and/or an OTA antenna.

Content repository 106 may store content in any suitable form. In one embodiment, content repository 106 stores advertisements. For example, the advertisements may be banners or tickers shown, e.g., on a bottom portion of the display and overlaid over the broadcast of the television show. In other examples, the advertisements are commercials shown during a break in the television show. In some embodiments, content repository 106 stores television shows, supplemental content (e.g., to supplement the television shows), or any other suitable form of content. Content stored in content repository 106 is associated with a predefined content identifier (ID).

It should be understood that while communications system 100 is described as a system for facilitating the delivery of content for broadcasting by the television broadcast system 104, in accordance with embodiments of the present invention, communications system 100 may be configured for delivery of content for broadcasting by a system of any type. For example, in one embodiment, television broadcast system 104 may be a radio broadcast system configured to broadcast radio transmissions.

Conventional television broadcast systems broadcast content according to a linearly programmed transmission log. However, advertisements and other forms of content are challenging to schedule due to the number of competing factors that must be considered in programming such transmission logs. Additionally, such linearly programmed transmission logs are difficult to modify to address last minute scheduling changes. While conventional network-based digital advertising servers are able to automatically select and schedule advertisements for display on a webpage, such conventional network-based digital advertising servers communicate in a format (e.g., JavaScript) associated with the network-based digital advertising server and are unable to directly communicate with television broadcast systems.

Embodiments of the present invention provide for a bridging system 110 for receiving a request for content from television broadcast system 104 in a broadcasting based format (e.g., cue tones) and communicating with a network-based content selection system 112 in a computer based format (e.g., JavaScript) for the selection of content. Advantageously, bridging system 110 allows network-based content selection system 112 to automatically select and/or schedule content from content repository 106 for broadcasting in response to a request for content from television broadcast system 104.

Content selection system 112 may be any system suitable for selecting content from content repository 106. In one embodiment, content selection system 112 is pre-configured (e.g., by a user) to maintain a listing of content and associated content identifiers to be consistent with content repository 106. In one embodiment, content selection system 112 is a known digital advertising server. Content selection system 112 and bridging system 110 communicate via network 114. Network 114 may include any type of network or combinations of different types of networks, and may be implemented in a wired and/or a wireless configuration. For example, network 114 may include one or more of the Internet, an intranet, a local area network (LAN), a wide area network (WAN), a cellular communications network, etc.

Figure 3:
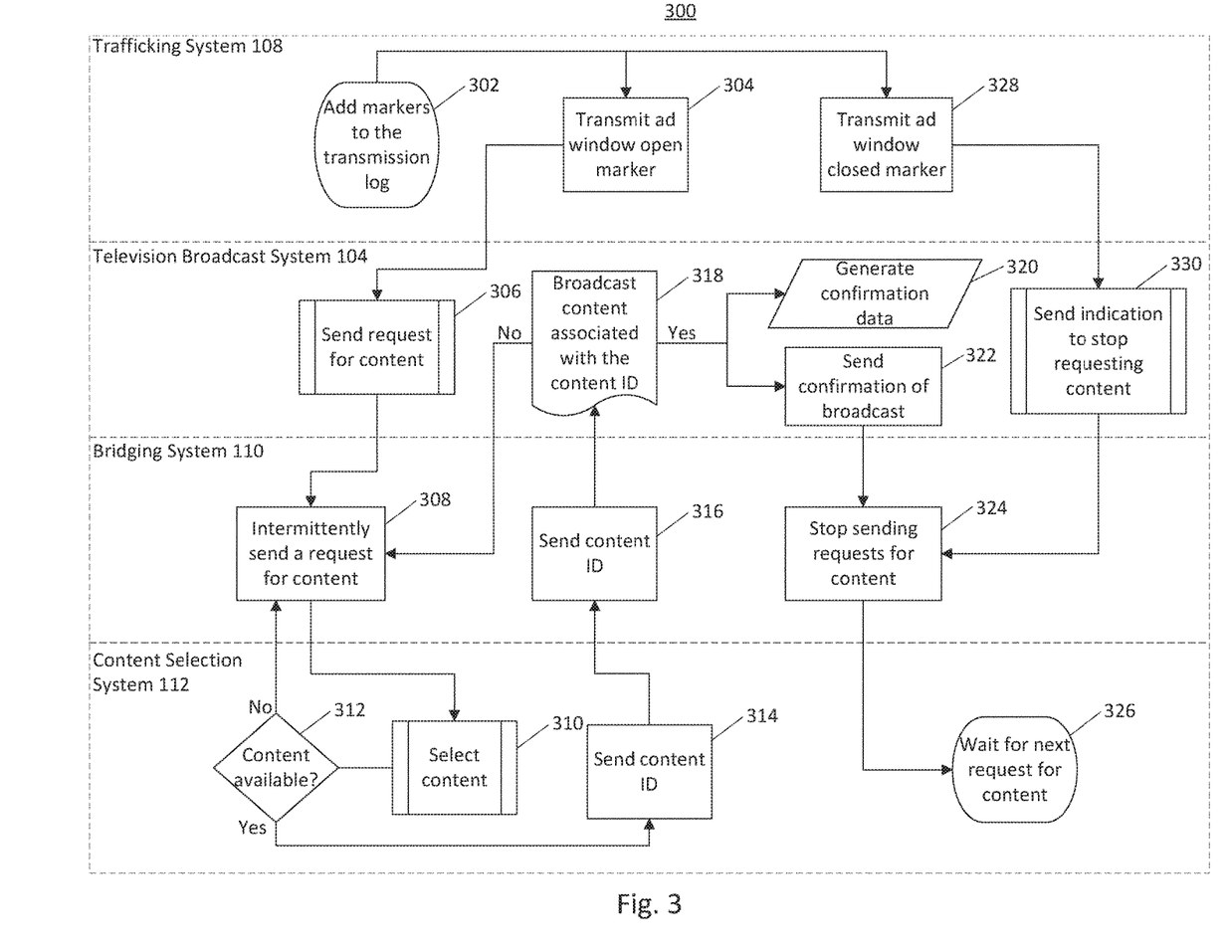
FIG. 3 shows a workflow for selecting and broadcasting content, in accordance with one embodiment.

FIG. 3 shows a workflow 300 for selecting and broadcasting content, in accordance with one or more embodiments. Workflow 300 will be described with respect to communications system 100 of FIG. 1. Each step of workflow 300 is depicted within a dashed box labelled with a respective system of trafficking system 108, television broadcast system 104, bridging system 110, or content selection system 112 to indicate performance of that step by that respective system. While workflow 300 will be described with respect to the selection of advertisements for broadcasting by television broadcast system 104, it should be understood that workflow 300 may be applied for the selection of any form of content for broadcasting by television broadcast system 104 in some embodiments.

At step 302, markers are added to a transmission log by trafficking system 108 (e.g., users interacting with trafficking system 108). The transmission log is a schedule of content to be broadcasted by television broadcast system 104 for a given period of time. In one embodiment, the transmission log does not define or schedule specific advertisements to be broadcast during such time windows. The markers define time windows in the transmission log in which content, such as advertisements, may be broadcasted. For example, the markers may include an ad window open marker and an ad window closed marker to indicate when the time window in which advertisements may be broadcast is opened and closed, respectively.

In one embodiment, the markers are in a broadcasting based format. As used herein, the term "broadcasting based format" refers to a format natively understood by television broadcast system 104. One example of a broadcasting based format is cue tones, such as, e.g., dual-tone multi-frequency signaling cue tones or sub-audible tones.

At step 304, an ad window open marker is transmitted by trafficking system 108 to television broadcast system 104. The ad window open marker is transmitted according to the schedule defined by the transmission log. The ad window open marker indicates that the time window for broadcasting advertisements by television broadcast system 104 is open. In one embodiment, the ad window open marker is transmitted by playing a cue tone.

At step 306, in response to receiving the ad window open marker, television broadcast system 104 sends a request for content to bridging system 110. The request for content sent to bridging system 110 is in a broadcasting based format (e.g., a cue tone).

At step 308, in response to receiving the request for content from television broadcast system 104, bridging system 110 will intermittently send requests for content to content selection system 112. Bridging system 110 will intermittently send requests for content, e.g., at predefined time intervals until it receives confirmation that selected content has been broadcasted or an indication to stop requesting content (step 324).

The request for content sent to content selection system 112 is in a computer based format. As used herein, the term "computer based format" refers to a format natively readable by computers. One example of a computer based format is JavaScript.

At step 310, in response to receiving the request for content from bridging system 110, network-based content selection system 112 selects content. In one embodiment, content selection system 112 is a known, digital internet advertisement server configured to automatically select and/or schedule content using known techniques. The content may be selected from content stored in content repository 106. In one embodiment, the content stored in content repository 106 comprises advertisements, such as, e.g., banners or tickers shown on a portion of the display during the broadcast of the television show. Content stored in content repository 106 is associated with a predefined content ID.

At step 312, if content selection system 112 determines that content is not available, workflow 300 returns to step 308 and bridging system 110 will continue to intermittently send a request for content to content selection system 112. If content selection system 112 determines that content is available, at step 314, content selection system 112 sends the content ID associated with the selected content to bridging system 110. In one embodiment, content selection system 112 sends the content ID to bridging system 110 in the computer based format.

At step 316, bridging system 110 receives the content ID from content selection system 112 and, in response, sends the content ID to television broadcast system 104. In one embodiment, bridging system 110 sends the content ID to television broadcast system 104 in the computer based format.

At step 318, television broadcast system 104 broadcasts the content associated with the content ID to content consumption devices 102. In one embodiment, television broadcast system 104 matches the content ID with content stored in repository 106 to retrieve and broadcast the content associated with the content ID. Once the content is broadcast to content consumption devices 102, television broadcast system 104 generates confirmation data at step 320. The confirmation data may include a log of the date, time, content name, or any other metadata relating to the broadcast of the content. The confirmation data may serve as an audit trail. At step 322, television broadcast system 104 will also send a confirmation that the content was broadcasted to bridging system 110.

At step 324, in response to receiving the confirmation that the content was broadcasted from television broadcast system 104, bridging system 110 will stop intermittently sending requests for content to content selection system 112. Accordingly, at step 326, content selection system 112 will wait for the next request for content.

At step 328, an ad window closed marker is transmitted by trafficking system 108 to television broadcast system 104 according to the schedule defined by the transmission log. The ad window closed marker indicates that the time window for broadcasting advertisements by television broadcast system 104 is closed. In response, at step 330, television broadcast system 104 sends an indication to stop requesting content to bridging system 110 and bridging system 110 stops intermittently sending requests for content at step 324.

It should be understood that certain steps of workflow 300 may be repeated starting at step 304 for each ad window open marker in the transmission log and/or starting at step 328 for each ad window closed marker in the transmission log.

Advantageously, bridging system 110 receives a request for content in a broadcasting based format and communicates with network-based content selection system 112 in a computer based format, thereby allowing content selection system 112 to select and/or schedule content for broadcasting by television broadcast system 104 and reducing or eliminating some of the manual scheduling of content (e.g., advertisements) on the transmission log. Further, the selection and/or scheduling of content by content selection system 112 allows the problem of pre-emption of advertisements to be avoided, as content selection system 112 can track how many advertisements are required over a period of time and ensure that the necessary advertisements are delivered without human intervention.

Figure 4:
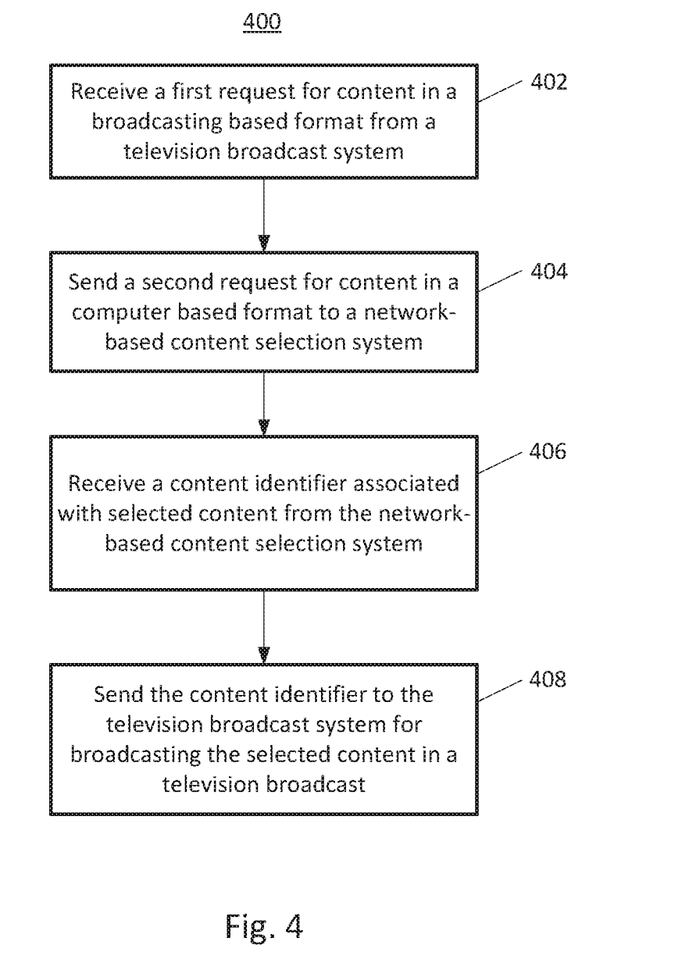
FIG. 4 shows a method for facilitating selection of content for broadcasting by a television broadcast system, in accordance with one embodiment.

FIG. 4 shows a method 400 for facilitating selection of content for broadcasting by a television broadcast system, in accordance with one or more embodiments. Method 400 will be described with respect to communications system 100 of FIG. 1 and workflow 300 of FIG. 3. In one embodiment, the steps of method 400 are performed by bridging system 110.

At step 402, a first request for content in a broadcasting based format is received from a television broadcast system. For example, bridging system 110 in workflow 300 of FIG. 3 receives a request for content sent by television broadcast system 104 at step 306. The broadcasting based format may be, e.g., a cue tone. The first request may be received from the television broadcast system in response to a first marker in a transmission log. The first marker may be an ad window open marker indicating that a time window in which advertisements or other content may be broadcast is opened. The first marker may be a cue tone (or other broadcasting based format).

At step 404, a second request for content in a computer based format is sent to a network-based content selection system. For example, bridging system 110 in workflow 300 of FIG. 3 sends a request for content to content selection system 112 at step 308. The computer based format may be, e.g., JavaScript. In one embodiment, the second request is intermittently sent at a predefined time interval. For example, the second request may be intermittently sent until a confirmation is received indicating that the selected content has been broadcasted. In another example, the second request may be intermittently sent until an indication to stop requesting content is received. The indication to stop request content may be received in response to a second marker in a transmission log, where the second marker indicates that the time window in which advertisements or other content may be broadcast is closed.

At step 406, in response to the network-based content selection system selecting content, a content identifier associated with the selected content is received from the network-based content selection system. For example, bridging system 110 in workflow 300 of FIG. 3 receives the content ID sent by content selection system 112 at step 314.

At step 408, the content identifier is sent to the television broadcast system for broadcasting the selected content in a television broadcast. For example, bridging system 110 in workflow 300 of FIG. 3 sends the content ID to television broadcast system 104 at step 316.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 3 and 4. Certain steps of the workflows and methods described herein, including one or more of the steps of FIGS. 3 and 4, may be performed by a server or by another processor in a network-based cloud-computing system. Certain steps of the workflows and methods described herein, including one or more of the steps of FIGS. 3 and 4, may be performed by a client computer in a network-based cloud computing system. The steps of the workflows and methods described herein, including one or more of the steps of FIGS. 3 and 4, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the workflow and method steps described herein, including one or more of the steps of FIGS. 3 and 4, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 5:
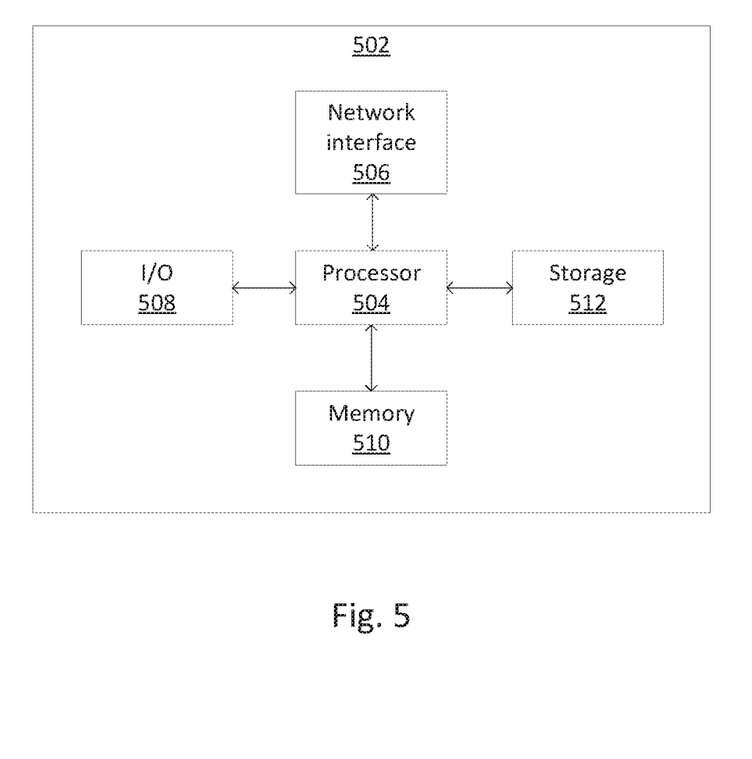
FIG. 5 shows a high-level block diagram of a computer, in accordance with one embodiment.

A high-level block diagram of an example computer that may be used to implement systems, apparatus, and methods described herein is depicted in FIG. 5. Computer 502 includes a processor 504 operatively coupled to a data storage device 512 and a memory 510. Processor 504 controls the overall operation of computer 502 by executing computer program instructions that define such operations. The computer program instructions may be stored in data storage device 512, or other computer readable medium, and loaded into memory 510 when execution of the computer program instructions is desired. Thus, the workflow and method steps of FIGS. 3 and 4 can be defined by the computer program instructions stored in memory 510 and/or data storage device 512 and controlled by processor 504 executing the computer program instructions. For example, the computer program instructions can be implemented as computer executable code programmed by one skilled in the art to perform the workflow and method steps of FIGS. 3 and 4. Accordingly, by executing the computer program instructions, the processor 504 executes the workflow and method steps of FIGS. 3 and 4. Computer 502 may also include one or more network interfaces 506 for communicating with other devices via a network. Computer 502 may also include one or more input/output devices 508 that enable user interaction with computer 502 (e.g., display, keyboard, mouse, speakers, buttons, etc.).

Processor 504 may include both general and special purpose microprocessors, and may be the sole processor or one of multiple processors of computer 502. Processor 504 may include one or more central processing units (CPUs), for example. Processor 504, data storage device 512, and/or memory 510 may include, be supplemented by, or incorporated in, one or more application-specific integrated circuits (ASICs) and/or one or more field programmable gate arrays (FPGAs).

Data storage device 512 and memory 510 each include a tangible non-transitory computer readable storage medium. Data storage device 512 and memory 510, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 508 may include peripherals, such as a printer, scanner, display screen, etc. For example, input/output devices 508 may include a display device such as a cathode ray tube (CRT) or liquid crystal display (LCD) monitor for displaying information to the user, a keyboard, and a pointing device such as a mouse or a trackball by which the user can provide input to computer 502.

Any or all of the systems and apparatus discussed herein, including content consumption devices 102, television broadcast system 104, content repository 106, trafficking system 108, bridging system 110, and content selection system 112 of FIG. 1, may be implemented using one or more computers such as computer 502.

One skilled in the art will recognize that an implementation of an actual computer or computer system may have other structures and may contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for facilitating selection of content for a television broadcast system, comprising:
   receiving a first request in a broadcasting based format from a television broadcast system, wherein the first request is for content to be broadcast by the television broadcast system during a time window in which specific content is not scheduled to be broadcast;
   sending a second request for content in a computer based format to a network-based content selection system;
   receiving a content identifier associated with selected content from the network-based content selection system; and
   sending the content identifier to the television broadcast system for broadcasting the selected content.

2. The method of claim 1, wherein the broadcasting based format comprises cue tones.

3. The method of claim 1, wherein the computer based format comprises JavaScript.

4. The method of claim 1, wherein the first request received from the television broadcast system is in response to a first marker in a transmission log indicating that the time window is opened.

5. The method of claim 1, wherein sending a second request for content in a computer based format to a network-based content selection system comprises:
   intermittently sending the second request for content to the network-based content selection system at a predefined time interval.

6. The method of claim 5, wherein intermittently sending the second request for content to the network-based content selection system at a predefined time interval comprises:
   intermittently sending the second request for content to the network-based content selection system until a confirmation is received indicating that the selected content has been broadcasted.

7. The method of claim 5, wherein intermittently sending the second request for content to the network-based content selection system at a predefined time interval comprises:
   intermittently sending the second request for content to the network-based content selection system until an indication to stop requesting content is received.

8. The method of claim 7, wherein the indication to stop requesting content is received in response to a second marker in a transmission log indicating that the time window is closed.

9. A non-transitory computer readable medium storing computer program instructions for facilitating selection of content for a television broadcast system, which, when executed on a processor, cause the processor to perform operations comprising:
   receiving a first request in a broadcasting based format from a television broadcast system, wherein the first request is for content to be broadcast by the television broadcast system during a time window in which specific content is not scheduled to be broadcast;
   sending a second request for content in a computer based format to a network-based content selection system;
   receiving a content identifier associated with selected content from the network-based content selection system; and
   sending the content identifier to the television broadcast system for broadcasting the selected content.

10. The non-transitory computer readable medium of claim 9, wherein the broadcasting based format comprises cue tones.

11. The non-transitory computer readable medium of claim 9, wherein the computer based format comprises JavaScript.

12. The non-transitory computer readable medium of claim 9, wherein the first request received from the television broadcast system is in response to a first marker in a transmission log indicating that the time window is opened.

13. An apparatus comprising:
a processor; and
a memory to store computer program instructions for facilitating selection of content for a television broadcast system, the computer program instructions when executed on the processor cause the processor to perform operations comprising:
receiving a first request in a broadcasting based format from a television broadcast system, wherein the first request is for content to be broadcast by the television broadcast system during a time window in which specific content is not scheduled to be broadcast;
sending a second request for content in a computer based format to a network-based content selection system;
receiving a content identifier associated with selected content from the network-based content selection system; and
sending the content identifier to the television broadcast system for broadcasting the selected content.

14. The apparatus of claim 13, wherein the broadcasting based format comprises cue tones and the computer based format comprises JavaScript.

15. The apparatus of claim 13, wherein sending a second request for content in a computer based format to a network-based content selection system comprises:
intermittently sending the second request for content to the network-based content selection system at a predefined time interval.

16. The apparatus of claim 15, wherein intermittently sending the second request for content to the network-based content selection system at a predefined time interval comprises:
intermittently sending the second request for content to the network-based content selection system until a confirmation is received indicating that the selected content has been broadcasted.

17. The apparatus of claim 15, wherein intermittently sending the second request for content to the network-based content selection system at a predefined time interval comprises:
intermittently sending the second request for content to the network-based content selection system until an indication to stop requesting content is received.

18. The apparatus of claim 17, wherein the indication to stop requesting content is received in response to a second marker in a transmission log indicating that the time window is closed.

19. A system for broadcasting content, comprising:
a television broadcast system configured to send a first request in a broadcasting based format to a bridging system, wherein the first request is for content to be broadcast by the television broadcast system during a time window in which specific content is not scheduled to be broadcast;
the bridging system configured to send a second request for content in a computer based format to a network-based content selection system in response to the first request in the broadcasting based format;
the network-based content selection system configured to:
select content in response to the second request for content, and
send a content identifier associated with the selected content
to the bridging system, and
the bridging system configured to send the content identifier to the television broadcast system for broadcasting the selected content.

20. The system of claim 19, wherein the broadcasting based format comprises cue tones and the computer based format comprises JavaScript.

* * * * *